US012687115B2

(12) United States Patent
Perez Reisler et al.

(10) Patent No.: US 12,687,115 B2
(45) **Date of Patent: *Jul. 21, 2026**

(54) INTERNAL ALUMINIDE COATING FOR VANES AND BLADES AND METHOD OF MANUFACTURE

(71) Applicant: RTX Corporation, Farmington, CT (US)

(72) Inventors: Rafael A. Perez Reisler, Arecibo, PR (US); Andy Turko, Southington, CT (US); Xuan Liu, Glastonbury, CT (US); Danielle E. Jencks, Glastonbury, CT (US); Glenn A. Cotnoir, Thompson, CT (US); Russell F. Croft, Tolland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/073,694

(22) Filed: Mar. 7, 2025

(65) Prior Publication Data

US 2025/0243770 A1 Jul. 31, 2025

Related U.S. Application Data

(60) Continuation of application No. 18/379,952, filed on Oct. 13, 2023, now Pat. No. 12,247,496, which is a (Continued)

(51) Int. Cl.
*F01D 5/28* (2006.01)

(52) U.S. Cl.
CPC .......... *F01D 5/288* (2013.01); *F05D 2220/32* (2013.01); *F05D 2230/10* (2013.01); (Continued)

(58) Field of Classification Search
CPC .. F01D 5/288; F05D 2220/32; F05D 2230/30; F05D 2230/314; F05D 2230/90
See application file for complete search history.

(56) References Cited

U.S. PATENT DOCUMENTS 4,933,239 A 6/1990 Olson et al.
5,771,577 A * 6/1998 Gupta ....................... C23C 4/01 29/889.721

(Continued)

FOREIGN PATENT DOCUMENTS

| | | | | |
|---|---|---|---|---|
| EP | 1160352 A1 | 12/2001 | | |
| EP | 2060653 A2 * | 5/2009 | ............. | C23C 10/60 |
| WO | 9705299 A1 | 2/1997 | | |

OTHER PUBLICATIONS

Extended European Search Report for EP Application No. 23188995.7, dated Feb. 5, 2024, 7 pages.

*Primary Examiner* — Brian Christopher Delrue
(74) *Attorney, Agent, or Firm* — Kinney & Lange, P.A.

(57) ABSTRACT

A gas turbine engine component includes a substrate having first surface and a second surface disposed opposite the first surface, a plurality of holes extending through the substrate from the first surface to the second surface, the holes defined by a plurality of respective walls each extending from the first surface to the second surface, a metallic bond coat disposed on the first surface, and an aluminide coating disposed on the first surface, the second surface, and the walls. The metallic bond coat is disposed between the first surface and the aluminide coating and the walls are free of the metallic bond coat.

17 Claims, 3 Drawing Sheets

Related U.S. Application Data division of application No. 17/882,180, filed on Aug. 5, 2022, now Pat. No. 11,821,337.

(52) U.S. Cl.
CPC .... *F05D 2230/30* (2013.01); *F05D 2230/314* (2013.01); *F05D 2230/90* (2013.01); *F05D 2300/611* (2013.01)

(56) References Cited

U.S. PATENT DOCUMENTS

| | | | | | |
|---|---|---|---|---|---|
| 6,123,997 | A | | 9/2000 | Schaeffer et al. | |
| 6,156,133 | A | * | 12/2000 | Czech | C23C 10/02 148/525 |
| 6,187,453 | B1 | | 2/2001 | Maloney | |
| 6,210,488 | B1 | * | 4/2001 | Bruce | B08B 3/12 216/101 |
| 7,204,019 | B2 | * | 4/2007 | Ducotey, Jr. | C23C 4/02 29/402.06 |
| 7,229,705 | B1 | * | 6/2007 | Johnson | F01D 5/288 428/688 |
| 10,472,972 | B2 | * | 11/2019 | Bunker | F01D 5/186 |
| 10,781,526 | B2 | | 9/2020 | Nagaraj et al. | |
| 2001/0048972 | A1 | | 12/2001 | Fernihough et al. | |
| 2004/0109948 | A1 | * | 6/2004 | Graham | C23C 10/20 427/404 |
| 2010/0266417 | A1 | | 10/2010 | Gorman et al. | |
| 2012/0189817 | A1 | * | 7/2012 | Rosenzweig | F01D 5/186 428/161 |
| 2017/0152749 | A1 | * | 6/2017 | Bunker | F01D 9/065 |
| 2018/0355477 | A1 | * | 12/2018 | Kojovic | C23C 4/11 |
| 2023/0047576 | A1 | * | 2/2023 | Craig | F23R 3/06 |
| 2023/0051153 | A1 | * | 2/2023 | Craig | F23R 3/005 |
| 2023/0052105 | A1 | * | 2/2023 | Craig | F01D 5/005 |

* cited by examiner

INTERNAL ALUMINIDE COATING FOR VANES AND BLADES AND METHOD OF MANUFACTURE

CROSS-REFERENCE TO RELATED APPLICATION(S)

This application is a continuation of U.S. application Ser. No. 18/379,952, filed Oct. 13, 2023 for "INTERNAL ALUMINIDE COATING FOR VANES AND BLADES AND METHOD OF MANUFACTURE", by R. Perez Reisler, A. Turko, X. Liu, D. Jencks, G. Cotnoir, and R. Croft, which is divisional of U.S. application Ser. No. 17/882,180 filed Aug. 5, 2022 for "INTERNAL ALUMINIDE COATING FOR VANES AND BLADES AND METHOD OF MANUFACTURE" by R. Perez Reisler, A. Turko, X. Liu, D. Jencks, G. Cotnoir, and R. Croft.

BACKGROUND

The present disclosure is directed generally to hot section components of a gas turbine engine and more particularly to coatings and methods of providing coatings to components that are provided with cooling features.

The advancement of alloy development (i.e., single crystal low sulfur alloys) and coatings has allowed for the continued push for increased turbine inlet temperatures and engine efficiency. Commercial, military, and industrial turbines have all benefited from these technological advancements. However, some advancements have come with associated costs. Increased needs for cooling of hot section components have led to increases in oxidation and corrosion, particularly of internal walls, resultant of manufacturing processes such as hole drilling. In fact, current hole drill processes have become primary drivers of turbine vane and blade distress.

Due to increased volumes, manufacturers have increased cooling hole drill speeds, which has been demonstrated to correspondingly increase cooling hole oxidation and corrosion. Recent efforts focused on controlling drill process speeds, fluids, and other drilling parameters to reduce cooling hole oxidation have only achieved marginally better results. Aluminide coatings have traditionally been used to reduce oxidation and corrosion. Aluminide coatings have been applied to superalloy substrates alone or in addition to metallic overlay coatings or bond coats, such as MCrAlY, which are often additionally coated with a thermal barrier coating (TBC) such as a yttrium stabilized zirconia (YSZ), to provide additional protection against oxidation and corrosion. Aluminide coatings can advantageously be provided to internal surfaces of components via a vapor phase aluminization process including pack cementation and chemical vapor deposition processes. In most conventional aluminide coating application methods, cooling holes are drilled following the alumnization process, which leaves cooling holes susceptible to oxidation. Studies have shown that significant oxidation of cooling holes and internal walls of turbine airfoils can result in internal core distress and plugging of cooling holes, which can drastically reduce the lifetime of a component. Methods that include providing an aluminide coating following hole drilling suffer from an inability to control coat down of cooling holes with subsequent coating deposition and a blockage of cooling holes during shot peening of the metallic bond coat. While techniques exist for opening cooling holes or manually filling holes with a temporary fill material during a deposition and peening process to prevent coat down and blockage, such processes are not feasible for components with high volumes of cooling holes or for high-throughput manufacturing.

A need exists for coating methods and multi-layer coatings that provide enhanced oxidation and corrosion protection of internal surfaces and cooling holes of components of gas turbine engines designed to meet increasing operational temperature demands, while also providing a feasible means for manufacturing components in a production environment.

SUMMARY

In one aspect, a gas turbine engine component includes a substrate having first surface and a second surface disposed opposite the first surface, a plurality of holes extending through the substrate from the first surface to the second surface, the holes defined by a plurality of respective walls each extending from the first surface to the second surface, a metallic bond coat disposed on the first surface, and an aluminide coating disposed on the first surface, the second surface, and the walls. The metallic bond coat is disposed between the first surface and the aluminide coating and the walls are free of the metallic bond coat.

In another aspect, a method of coating a component of a gas turbine engine includes applying a metallic bond coat to a first surface of a substrate, drilling a plurality of holes through the metallic bond coat and the substrate, wherein the plurality of holes open to the first surface and an oppositely disposed second surface of the substrate, the holes defined by a plurality of respective walls each extending from the first surface to the second surface, and applying an aluminide coating to the first surface of the substrate, the walls of the holes, and the second surface of the substrate.

The present summary is provided only by way of example, and not limitation. Other aspects of the present disclosure will be appreciated in view of the entirety of the present disclosure, including the entire text, claims and accompanying figures.

Figure 1:
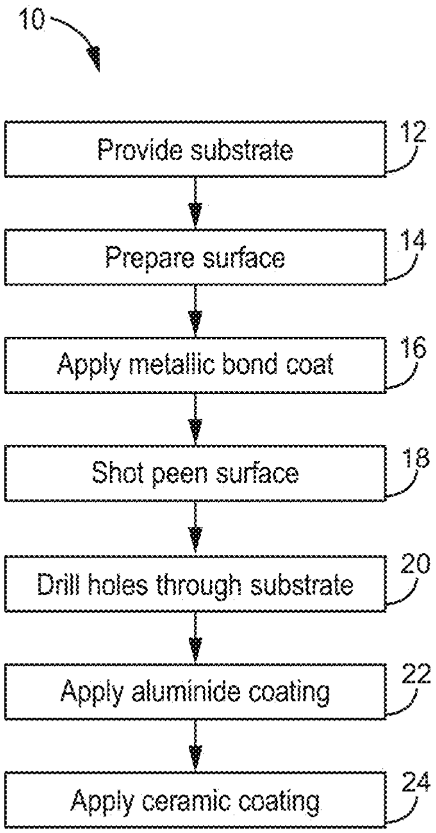
FIG. 1 is a flow chart of a method of applying a multilayer coating to a gas turbine engine component.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a coating method and multi-layer coating developed to protect hot section components of a gas turbine engine from oxidation and corrosion. Benefits of the disclosed method and multi-layer coating include protection of cooling holes from oxidation independent of a drilling process and drill speed; protection of internal core walls of turbine vanes, blades, and other structures with internal cooling passages; optimization of the manufacturing process for such components; and an increase in component lifetime. The disclosed multi-layer coating and coating method can provide protection of both an internal core or internal surface of a component and cooling holes and provides an efficient means to manufacture components in a production environment. The disclosed process eliminates the current problems associated with the cooling hole drill process because the disclosed multi-layer coating, which includes an aluminide coating applied to internal surfaces and cooling holes, can replenish aluminum at a surface of the cooling holes and provide a protective layer.

It will be understood by one of ordinary skill in the art that the disclosed multi-layer coating and method of coating a component is suitable for multiple components, including but not limited to, turbine blades, turbine vanes, blade outer air seals (BOAS), shrouds, combustor panels, and other components of gas turbine engine susceptible to oxidation and corrosion.

FIG. 1 is a flow chart of method 10 of applying a multi-layer coating to a gas turbine engine component. A substrate having oppositely disposed surfaces is provided in step 12. The substrate can be a superalloy, for example, a single crystal low sulfur nickel-based superalloy, or other alloy suitable for high temperature operation as known in the art. The oppositely disposed surfaces can include an external surface and an internal surface defined, for example, by internal cooling passages of a component such as a turbine blade, turbine vane, or BOAS. In other embodiments, oppositely disposed surfaces can include two external surfaces, one of which may form an internal surface adjacent to a cooling plenum during operation. For example, the substrate can be a combustor liner panel or heat shield, which includes two external surfaces when uninstalled but can be considered to include an internal surface when installed to a combustor shell in a gas turbine engine.

External surfaces of the substrate can be prepared in step 14, for example, by grinding using methods known in the art.

A metallic bond coat is deposited on one or more external surfaces of the substrate in step 16. The metallic bond coat can be, for example, an MCrAlY coating. Particular chemical compositions of the metallic bond coat are discussed further herein. The metallic bond coat can be applied by plasma spraying, such as a low pressure plasma spray (LPPS) process or a physical vapor deposition (PVD) process, such as cathodic arc deposition. Portions of the component can be masked to limit coating deposition to particular surfaces or regions of the component using known masking techniques.

Surfaces coated with the metallic bond coat undergoes a shot peening process in step 18. Shot peening can improve the surface condition for mechanical bonding and oxidation/corrosion resistance of the metallic bond coat. Shot peening can be conducted using materials and methods known in the art.

Cooling holes are drilled through metallic bond coat and the substrate in step 20. Cooling holes can be drilled, for example, using EDM. EDM can be used to provide small cooling holes and cooling holes having complex geometries, such as diffuser sections and tapered shapes, with high throughput. In other embodiments, cooling holes can be drilled using other known drilling processes, including but not limited to laser drilling and water jet drilling processes. Cooling holes are drilled following deposition of the metallic bond coat and shot peening process to limit coat down and blockage of cooling holes caused by deposition of the coating or shot peening material in the cooling holes. This reduces or eliminates the need for subsequent material removal from the cooling holes or use of tools to prevent coating and shot peening material from entering the cooling holes during the coating deposition and shot peening processes. Cooling holes can be sized to accommodate an aluminide coating deposited along a length of the cooling holes and a thermal barrier coating (TBC) deposited on the external surface of the component and which can extend into the cooling hole adjacent to the external surface.

An aluminide coating is applied to the substrate in step 22. The aluminide coating can be a vapor phase diffusion aluminide as known in the art. The aluminide can be applied using known pack or above the pack cementation or chemical vapor deposition methods. The aluminide coating can be applied to all surfaces of the component, including external surfaces, internal surfaces (e.g., turbine blade or vane cores), and surfaces defining cooling holes. The vapor-phase aluminide is capable of reaching internal surfaces of the substrate through openings (e.g., in a root of a blade) that feed internal cooling passages or a cooling plenum and through cooling holes. The aluminide coating can be applied to the metallic bond coat. A portion of the aluminide coating can diffuse into the metallic bond coat and into uncoated substrate surfaces. A thickness of the aluminide coating extending outward from the substrate or metallic bond coat can be approximately equal to a thickness of the aluminide coating diffused into the substrate or metallic bond coat.

An optional TBC can be applied to external surfaces of the component. The TBC can be a ceramic material applied, for example, using electron beam physical vapor deposition (EB-PVD) or plasma spraying processes such as air plasma spray (APS), suspension plasma spray (SPS), or solution precursor plasma spray (SPPS). Particular chemical compositions for the TBC are discussed further herein. The TBC can form an outermost protective layer of the component. A portion of the TBC can be deposited on walls of the cooling holes adjacent to the external surface. The depth to which the TBC extends into the cooling holes or thickness of the TBC on any particular region of the cooling hole wall can depend on the deposition method and process parameters (e.g., plasma spray deposition angle, coating thickness, etc.).

Although not described herein, additional steps, including heat treatment, cooling, masking, cleaning, and additional surface preparation processes may be included in the coating method. It will be understood by one of ordinary skill in the art that such processes, known in the art, can be included without departing from the scope of the present disclosure.

Figure 2:
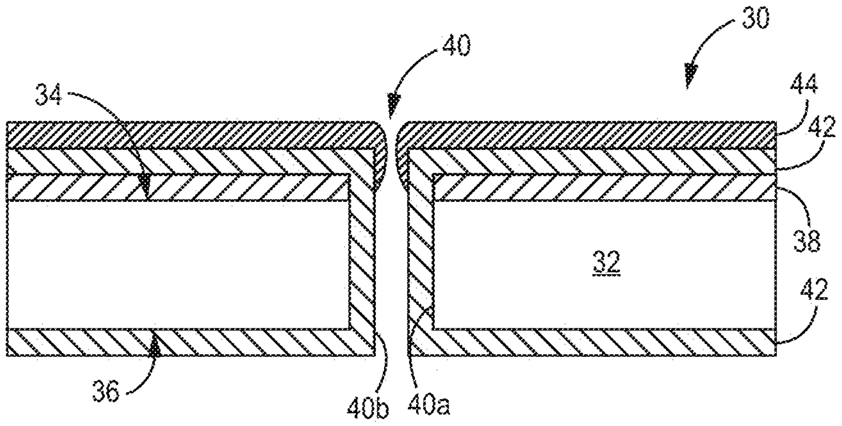
FIG. 2 is a schematized cross-sectional view of a multilayer coating applied to a gas turbine engine component.

FIG. 2 is a schematized cross-sectional view of a multi-layer coating applied to a gas turbine engine component. FIG. 2 shows component 30 having substrate 32 with oppositely disposed surfaces 34 and 36, metallic bond coat 38, hole 40, aluminide coating 42, and TBC 44.

Component 30 can be, for example, a component of a hot section of a gas turbine engine, including but not limited to, a turbine blade, turbine vane, BOAS, or combustor panel. Component 30 can be suitable for use in commercial, military, or industrial turbines. Component 30 can be subject to oxidation and corrosion during operation and manufacturing processes.

Substrate 32 can be a superalloy, for example, a single crystal low sulfur nickel-based superalloy, or other alloy suitable for high temperature operation as known in the art.

Surface 34 can be an external surface of substrate 32. Surface 34 can be, for example, positioned in a hot gas path of a gas turbine engine during operation. Surface 36 can be an internal surface of substrate 32. Surface 36 can be, for example, a core of a turbine blade or vane configured to receive a cooling fluid during operation of the gas turbine engine. Surface 36 can have a complex geometry and can be defined by multiple surfaces opening to external surface 34.

Metallic bond coat 38 is disposed on external surface 34. Metallic bond coat 38 can be an MCrAlY coating compatible with aluminide coating 42, where M is selected from the group consisting of iron, nickel, cobalt, and combinations thereof. MCrAlY coatings are described, for example, in U.S. Pat. Nos. 4,585,481 and 4,514,469. Metallic bond coat 38 can have a thickness of less than 0.008 inches (203 micrometers) or a thickness of less than 0.002 inches (50.8 micrometers). A thickness of metallic bond coat 38 can vary depending on the type of component. For example, a thickness of metallic bond coat 38 on a turbine blade, which is exposed to high centrifugal force in operation, can be less than a thickness of metallic bond coat 38 on a static turbine vane. A thickness of metallic bond coat 28 on a turbine blade, can be for example between about 0.001 inches (25.4 micrometers) and 0.002 inches (50.8 micrometers); whereas a thickness of metallic bond coat 38 on a vane can be, for example, between about 0.0035 inches (88.9 micrometers) and 0.008 inches (203 micrometers). A BOAS can have a substantially thicker metallic bond coat 38. For example, a thickness of metallic bond coat 38 on a BOAS can be greater than 0.01 inches (254 micrometers). The thickness of metallic bond coat 38 on a turbine blade can be reduced to minimize an increase in the weight of the blade. One important failure mode of turbine blades is creep, which increases with blade weight. Coating thicknesses must be considered to increase creep life and optimize blade design. Metallic bond coat 38 can be deposited by LPPS with surface modification provided by shot peening. In applications requiring thinner layers, metallic bond coat 38 can be deposited by cathodic arc deposition followed by shot peening.

Hole 40 can extend through component 30, opening to oppositely disposed surfaces 34 and 36. Hole 40 can be a cooling hole configured to deliver a cooling fluid from an internal cooling plenum (e.g., a turbine blade or vane core) for film cooling, for example, of external surface 34. Hole 40 can have a complex geometry as known in the art. For example, hole 40 can have a tapered cross-section or diffuser section. Hole 40 can be disposed at any angle through component 30 and can have any cross-sectional area as needed to provide effective film cooling of the component. Multiple holes 40 can be provided through component 30 in any arrangement as known in the art to optimize component cooling.

For purposes of illustrating the method of manufacture, hole 40 is shown as having uncoated walls 40*a* and coated walls 40*b*. Uncoated walls 40*a* are formed by substrate 32 and metallic bond coat 38. A length of uncoated walls 40*a* is defined by a thickness of substrate 32, extending between external surface 34 and internal surface 36, and by a thickness of metallic bond coat 38 at an edge formed when cooling hole 40 is drilled through metallic bond coat 38. Coated walls 40*b* are formed by aluminide coating 42 deposited on uncoated walls 40*a* and TBC 44 deposited on aluminide coating 42 adjacent to an outermost surface of component 30 on external surface 34.

Aluminide coating 42 can be disposed on external surface 34, internal surface 36, and uncoated walls 40*a* of cooling hole 40. Specifically, aluminide coating is deposited on an outermost surface of metallic bond coat 38 including an edge of metallic bond coat 38 defining a portion of hole 40 and is deposited on substrate 32 on internal surface 34 and substrate walls defining cooling hole 40. As previously described, holes 40 are drilled following the deposition of metallic bond coat 38 and the shot peening process to limit coat down or plugging of holes 40 resultant of deposition of metallic bond coat 38 or shot peen material in holes 40. As such, uncoated walls 40*a* are formed by substrate 32 and metallic bond coat 38. Hole 40 can be sized and/or shaped to accommodate a desired thickness of aluminide coating 42 and possible deposition of TBC 44 in hole 40.

Metallic bond coat 38 is disposed between substrate 32 and aluminide coating 42 and can be fully enveloped by aluminide coating 42 such that no portion of metallic bond coat 38 is exposed. Aluminide coating 42 can be any vapor phase aluminide as known in the art and applied using known methods as previously described. Aluminide coating 42 can have a thickness extending from metallic bond coat 38 at external surface 34 and from substrate 32 in cooling hole 40 and internal surface 36 ranging from approximately 0.0005 inches to 0.003 inches (12.7 micrometers to 76.2 micrometers). A thickness of aluminide coating 42 on internal surface 36 can be less than a thickness of aluminide coating 42 on metallic bond coat 38. For example, the thickness of aluminide coating 42 on internal surface 36 can range, for example, from about 0.0005 inches to 0.0015 inches (12.7 micrometers to 38.1 micrometers); wherein the thickness of aluminide coating 42 on metallic bond coat 38 at external surface and in cooling hole 40 can range, for example from about 0.001 inches to 0.003 inches (25.4 micrometers to 76.2 micrometers) A thickness of aluminide coating 42 can vary depending on the type of component. For example, a thickness of aluminide coating 42 on a turbine blade, which are exposed to high centrifugal force in operation, can be less than a thickness of aluminide coating 42 on a turbine vane to reduce the weight of the blade. The thickness of aluminide coating 42 deposited in cooling holes using know vapor deposition processes has been extensively studied and can be controlled.

Aluminide coating 42 can diffuse into metallic bond coat 38 on external surface 34 and into substrate 32 on internal surface 36 and uncoated walls 40*a* of cooling hole 40 a depth that is approximately equal to the thickness extending outward from metallic bond coat 38 and substrate 32. As illustrated in FIG. 2, the thickness of aluminide coating 42 can be uniform along a length of hole 40 between an outermost surface aluminide coating 42 on external surface 34 and an outermost surface of aluminide coating 42 on internal surface 36.

TBC 44 can be deposited on external surface 34. Specifically, TBC 44 can be deposited on aluminide coating 38 on external surface 34. A portion of TBC 44 can extend into hole 40 as illustrated in FIG. 2. The depth to which TBC 44 extends or thickness of TBC 44 in any location of hole 40 can vary depending on the method of deposition as previously discussed. On external surface 34, aluminide coating 42 is disposed between metallic bond coat 38 and TBC 44. On internal surface 36, aluminide coating 42 forms an outermost coating layer.

TBC 44 can be a ceramic material suitable for bonding with aluminide coating 42. TBC can be, for example, yttria-stabilized zirconium (YSZ) and/or gadolinium zirconate (GdZ). In some embodiments, TBC can be a multilayer system including layers formed of different ceramic materials as known in the art. TBC 44 can have a columnar microstructure, for example, as formed by SPS or EB-PVD deposition.

Figure 3:
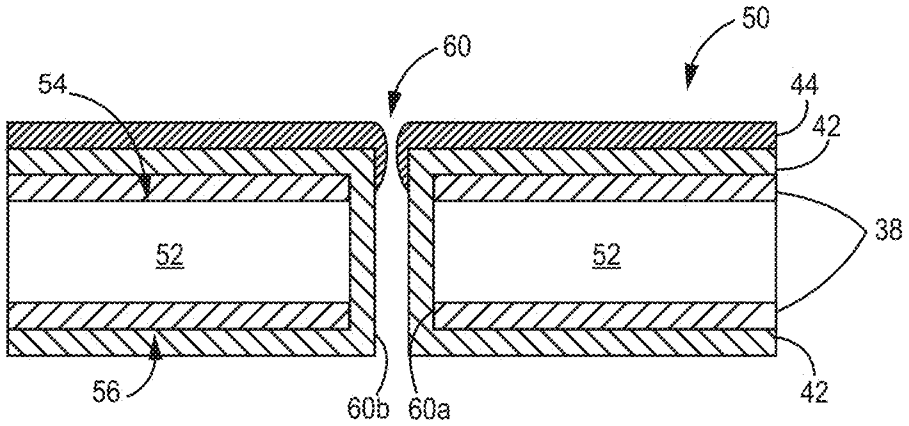
FIG. 3 is a schematized cross-sectional view of another embodiment of a multi-layer coating applied to a gas turbine engine component.

FIG. 3 is a schematized cross-sectional view of another embodiment of a multi-layer coating applied to a gas turbine engine component. FIG. 3 shows component 50 having substrate 52 with oppositely disposed external surfaces 54 and 56, metallic bond coat 38, hole 60 including uncoated wall 60*a* and coated wall 60*b*, aluminide coating 42, and TBC 44. The multi-layer coating of component 50 is substantially similar to the multi-layer coating of component 30 with the exception that component 50 has two external surfaces 54 and 56 with metallic bond coat 38 disposed on both surfaces. Multiple holes 60 can be provided through component 50 in any arrangement as known in the art to optimize component cooling.

Discussion of Possible Embodiments

The following are non-exclusive descriptions of possible embodiments of the present invention.

A gas turbine engine component includes a substrate having first surface and a second surface disposed opposite the first surface, a plurality of holes extending through the substrate from the first surface to the second surface, the holes defined by a plurality of respective walls each extending from the first surface to the second surface, a metallic bond coat disposed on the first surface, and an aluminide coating disposed on the first surface, the second surface, and the walls. The metallic bond coat is disposed between the first surface and the aluminide coating and the walls are free of the metallic bond coat.

The gas turbine engine component of the preceding paragraph can optionally include, additionally and/or alternatively, any one or more of the following features, configurations and/or additional components:

The gas turbine engine component of the preceding paragraphs, wherein the second surface is an internal surface and wherein the aluminide coating on the second surface has a thickness ranging from approximately 12.7 to 38.1 micrometers (0.0005 inches to 0.0015 inches).

The gas turbine engine component of any of the preceding paragraphs, wherein the first surface is an external surface and wherein the aluminide coating on the first surface has a thickness ranging from approximately 25.4 to 76.2 micrometers (0.001 inches to 0.003 inches).

The gas turbine engine component of any of the preceding paragraphs, wherein the component is a rotor blade.

The gas turbine engine component of any of the preceding paragraphs, wherein a portion of the aluminide coating is diffused into the substrate on the walls of the holes and diffused into the metallic bond coat on the first surface.

The gas turbine engine component of any of the preceding paragraphs, wherein the first surface is an external surface and the second surface is an internal surface.

The gas turbine engine component of any of the preceding paragraphs, wherein the component is turbine blade or vane.

The gas turbine engine component of any of the preceding paragraphs, wherein the metallic bond coat is disposed on the second surface between the substrate and the aluminide coating.

The gas turbine engine component of any of the preceding paragraphs, wherein the metallic bond coat is an MCrAlY coating.

The gas turbine engine component of any of the preceding paragraphs, and further including a ceramic coating disposed on the first surface, wherein the aluminide coating is disposed between the metallic bond coat and the ceramic coating.

The gas turbine engine component of any of the preceding paragraphs, wherein the ceramic coating has a columnar microstructure.

A method of coating a component of a gas turbine engine includes applying a metallic bond coat to a first surface of a substrate, drilling a plurality of holes through the metallic bond coat and the substrate, wherein the plurality of holes open to the first surface and an oppositely disposed second surface of the substrate, the holes defined by a plurality of respective walls each extending from the first surface to the second surface, and applying an aluminide coating to the first surface of the substrate, the walls of the holes, and the second surface of the substrate.

The method of the preceding paragraph can optionally include, additionally and/or alternatively, any one or more of the following features, configurations, additional components, and/or steps:

The method the preceding paragraphs, wherein the plurality of holes are drilled using electrical discharge machining (EDM).

The method of any of the preceding paragraphs can further include grinding the first surface of the substrate prior to applying the metallic bond coat.

The method of any of the preceding paragraphs can further include shot peening the metallic bond coat before drilling the plurality of holes.

The method of any of the preceding paragraphs can further include applying a ceramic coating to the first surface, wherein the aluminide coating is disposed between the metallic bond coat and the ceramic coating.

The method of any of the preceding paragraphs, wherein the ceramic coating has a columnar microstructure.

The method of any of the preceding paragraphs, wherein the metallic bond coat is an MCrAlY coating.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine component comprising:
- a metal substrate having first surface and a second surface disposed opposite the first surface;
- a plurality of holes extending through the metal substrate from the first surface to the second surface, the holes defined by a plurality of respective walls each extending from the first surface to the second surface;
- a metallic bond coat disposed on the first surface; and
- a diffusion aluminide coating disposed on the first surface, the second surface, and the walls, wherein the metallic bond coat is disposed between the first surface and the diffusion aluminide coating and wherein the walls are free of the metallic bond coat.

2. The gas turbine engine component of claim 1, wherein the second surface is an internal surface and wherein the aluminide coating on the second surface has a thickness ranging from 12.7 to 38.1 micrometers (0.0005 inches to 0.0015 inches).

3. The gas turbine engine component of claim 1, wherein the first surface is an external surface and wherein the aluminide coating on the first surface has a thickness ranging from 25.4 to 76.2 micrometers (0.001 inches to 0.003 inches).

4. The gas turbine engine component of claim 3, wherein the component is a rotor blade.

5. The gas turbine engine component of claim 2, wherein a portion of the aluminide coating is diffused into the substrate on the walls of the holes and diffused into the metallic bond coat on the first surface.

6. The gas turbine engine component of claim 5, wherein the aluminide coating on the first surface has a thickness extending from the metallic bond coat equal to a thickness of the aluminide coating diffused into the metallic bond coat.

7. The gas turbine engine component of claim 5, wherein the aluminide coating on the walls of the holes has a thickness extending from the walls of the holes equal to a thickness of the aluminide coating diffused into the substrate on the walls of the holes.

8. The gas turbine engine component of claim 1, wherein the first surface is an external surface and the second surface is an internal surface.

9. The gas turbine engine component of claim 8, wherein the component is turbine blade or vane.

10. The gas turbine engine component of claim 1, wherein the metallic bond coat is disposed on the second surface between the substrate and the aluminide coating.

11. The gas turbine engine component of claim 1, wherein the metallic bond coat is an MCrAlY coating.

12. The gas turbine engine component of claim 1, and further comprising a ceramic coating disposed on the first surface, wherein the aluminide coating is disposed between the metallic bond coat and the ceramic coating.

13. The gas turbine engine component of claim 12, wherein the ceramic coating comprises a yttria-stabilized zirconia (YSZ) and/or gadolinium zirconate.

14. The gas turbine engine component of claim 12, wherein the ceramic coating has a columnar microstructure.

15. The gas turbine engine of claim 1, wherein the metal substrate is nickel-based superalloy.

16. The gas turbine engine of claim 1, wherein the plurality of holes are disposed at an angle relative to the first surface.

17. The gas turbine engine of claim 16, wherein each of the plurality of holes has a diffuser section having a tapered shaper.

* * * * *